US012732535B2

(12) United States Patent
Varadarajan et al.

(10) Patent No.: US 12,732,535 B2
(45) Date of Patent: *Sep. 8, 2026

(54) PROVIDING APPLICATION SECURITY USING CAUSAL GRAPH

(71) Applicant: Palo Alto Networks, Inc., Santa Clara, CA (US)

(72) Inventors: Subramanian Varadarajan, Lost Gatos, CA (US); Rosarin Jolly Roy Antonyraj, Santa Clara, CA (US); Kumaravel Senthivel, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 18/519,828

(22) Filed: Nov. 27, 2023

(65) Prior Publication Data

US 2024/0089288 A1 Mar. 14, 2024

Related U.S. Application Data

(63) Continuation of application No. 17/096,705, filed on Nov. 12, 2020, now Pat. No. 11,838,316, which is a (Continued)

(51) Int. Cl.
*H04L 9/40* (2022.01)

(52) U.S. Cl.
CPC ...... *H04L 63/1458* (2013.01); *H04L 63/0281* (2013.01); *H04L 63/10* (2013.01); *H04L 63/1425* (2013.01)

(58) Field of Classification Search
CPC ... H04L 63/0281; H04L 63/029; H04L 63/10; H04L 63/1416; H04L 63/1425;
(Continued)

(56) References Cited

U.S. PATENT DOCUMENTS

| | | |
|---|---|---|
| 9,332,065 B2 | 5/2016 | Ravi |
| 9,947,030 B1 | 4/2018 | Samdadiya et al. |

(Continued)

OTHER PUBLICATIONS

Bai et al. "Detecting Malicious Behavior using Critial API calling Graph Matching" [Online], Dec. 28, 2009[Retrieved on: Jan. 10, 2026], ICISE2009, Retrieved from: < https://ieeexplore.ieee.org/stamp/stamp.jsp?tp=&arnumber=5455762 > (Year: 2009).*

(Continued)

*Primary Examiner* — Eric W Shepperd
(74) *Attorney, Agent, or Firm* — Gilliam IP PLLC

(57) ABSTRACT

Computer systems and methods are provided for storing a first path profile. A computing device receives a first request to access a first location of a website, transmits the first request to a server, and receives a first cookie that includes identifying information for the first location. In response to receiving the first cookie, the device stores the identifying information. The device receives a second request to access a second location of the website that is distinct from the first location. The second request includes the identifying information for the first location. The device transmits the second request to the server and receives a second cookie that includes the identifying information for the first location and for the second location. In response to receiving the second cookie, the device stores the first path profile that includes the identifying information for the first location and the second location.

20 Claims, 16 Drawing Sheets

Related U.S. Application Data continuation of application No. 16/032,610, filed on Jul. 11, 2018, now Pat. No. 10,873,599.

(60) Provisional application No. 62/531,198, filed on Jul. 11, 2017.

(58) Field of Classification Search
CPC ............... H04L 63/1458; H04L 63/168; H04L 2463/141; H04L 2463/142; G06F 21/554
See application file for complete search history.

(56) References Cited

U.S. PATENT DOCUMENTS

| | | | | |
|---|---|---|---|---|
| 10,887,341 | B2 * | 1/2021 | Doron | H04L 63/101 |
| 2014/0282872 | A1 | 9/2014 | Hansen et al. | |
| 2014/0283068 | A1 | 9/2014 | Call et al. | |
| 2016/0021117 | A1 | 1/2016 | Harmon et al. | |
| 2016/0308900 | A1 * | 10/2016 | Sadika | H04L 63/1416 |
| 2017/0126627 | A1 | 5/2017 | Yang et al. | |
| 2017/0163647 | A1 | 6/2017 | Cernoch et al. | |
| 2018/0007085 | A1 * | 1/2018 | Holloway | H04L 63/1408 |
| 2018/0288063 | A1 | 10/2018 | Koottayi et al. | |
| 2018/0367551 | A1 * | 12/2018 | Muddu | H04L 41/0893 |
| 2019/0311132 | A1 * | 10/2019 | Arnoth | H04L 63/1433 |
| 2021/0258329 | A1 * | 8/2021 | Clayton | H04L 63/1416 |

OTHER PUBLICATIONS

Wang et al. "Using API Sequence and Bayes Algorithm to Detect Suspicious Behavior" [Online], Feb. 28, 2009 [Retrieved on: Jan. 10, 2026], ICCSN2009 , Retrieved from: < https://ieeexplore.ieee.org/stamp/stamp.jsp?tp=&arnumber=5076911 > (Year: 2009).*

Naik, et al., "Securing Digital Identities in the Cloud by Selecting an Apposite Federated Identity Management from SAML, OAuth and OpenID Connect", 2017 11th International Conference on Research Challenges in Information Science (RCIS),, May 2017, pp. 163-174.

* cited by examiner

1100

1102
Receive, from a first remote device, a first request to access a first location of a website 1104
Transmit, to a server that corresponds to the website, the first request to access the first location 1106
Receive, from the server, a first cookie that includes identifying information for the first location 1108
In response to receiving the first cookie, store the identifying information for the first location 1110
Receive, from the first remote device, a second request to access a second location of the website, wherein: the second location is distinct from the first location, and the second request includes the identifying information for the first location 1112
Transmit, to the server, the second request to access the second location 1114
Receive, from the server, a second cookie that includes the identifying information for the first location and identifying information for the second location

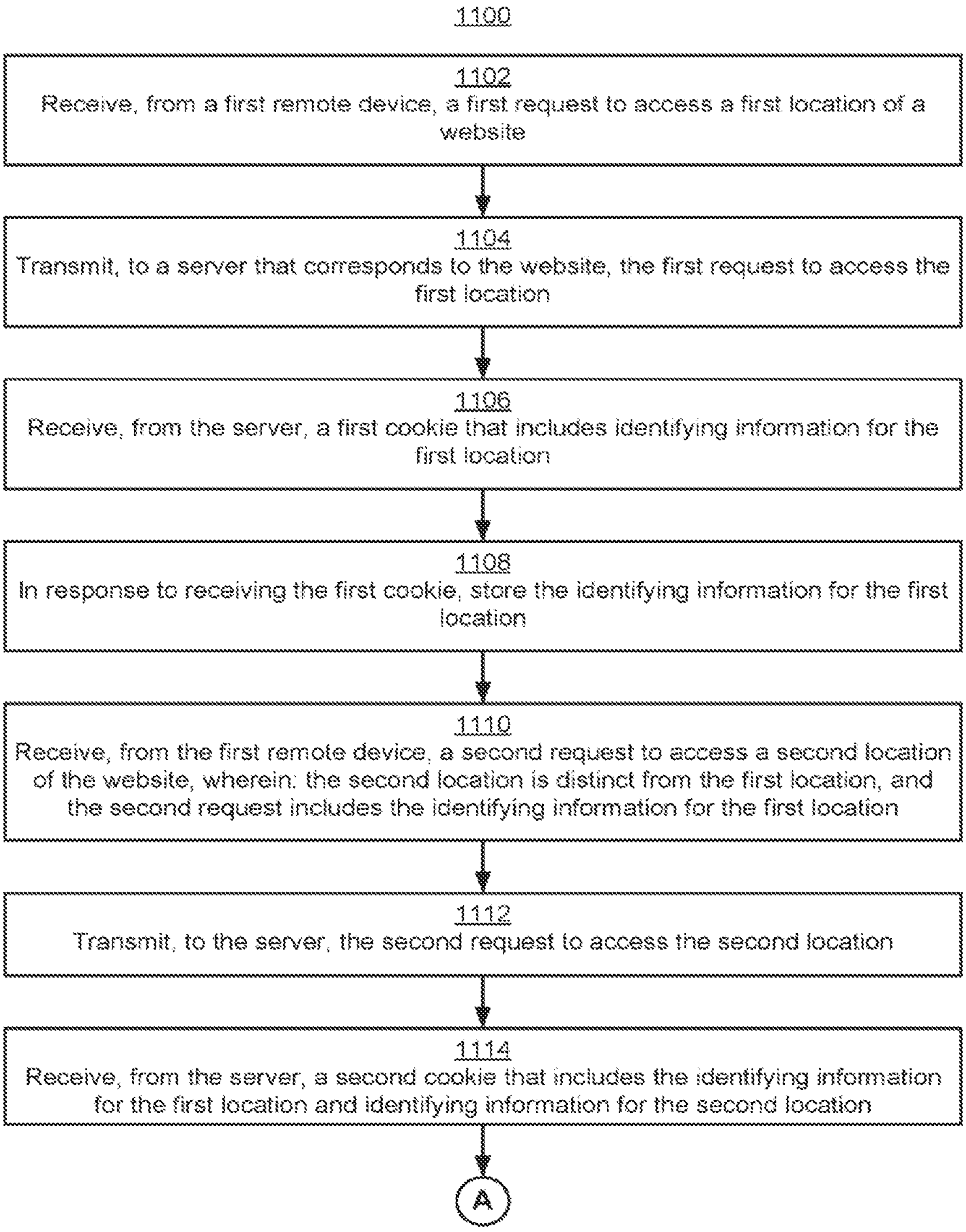

FIG. 11A

1116
In response to receiving the second cookie, store a first path profile that includes the identifying information for the first location and the identifying information for the second location 1118
Store a plurality of path profiles that include at least a first path profile and a second path profile 1120
Use the plurality of path profiles to generate at least one path pattern 1122
The at least one path pattern includes a pattern that indicates a tier-to-tier traversal of the website 1124
For a respective path profile of the plurality of path profiles, determinine whether the respective path profile includes a first path characteristic; and in accordance with a determination that the respective path profile includes the first path characteristic, incrementing a counter that corresponds to the first path characteristic

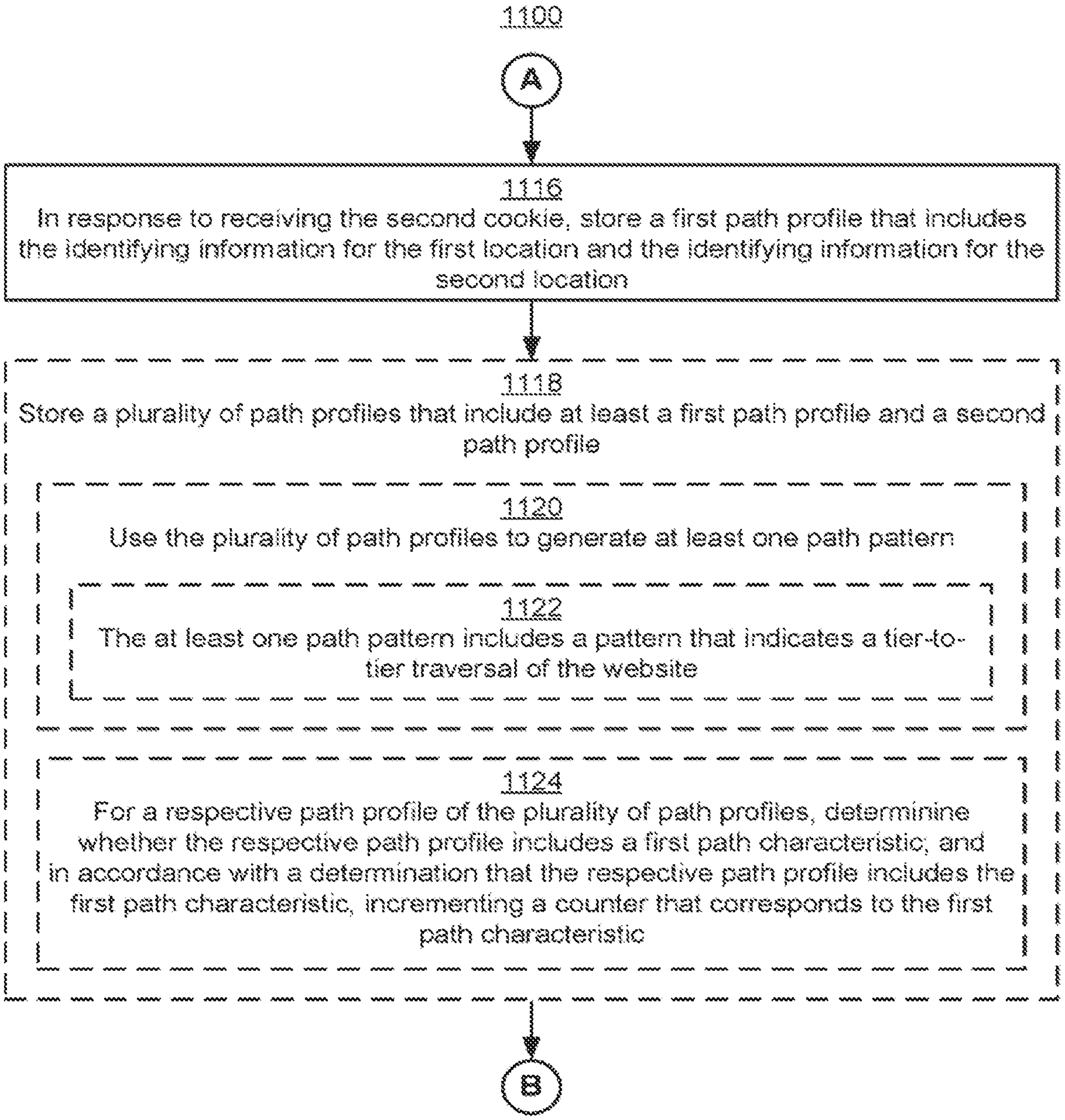

FIG. 11B

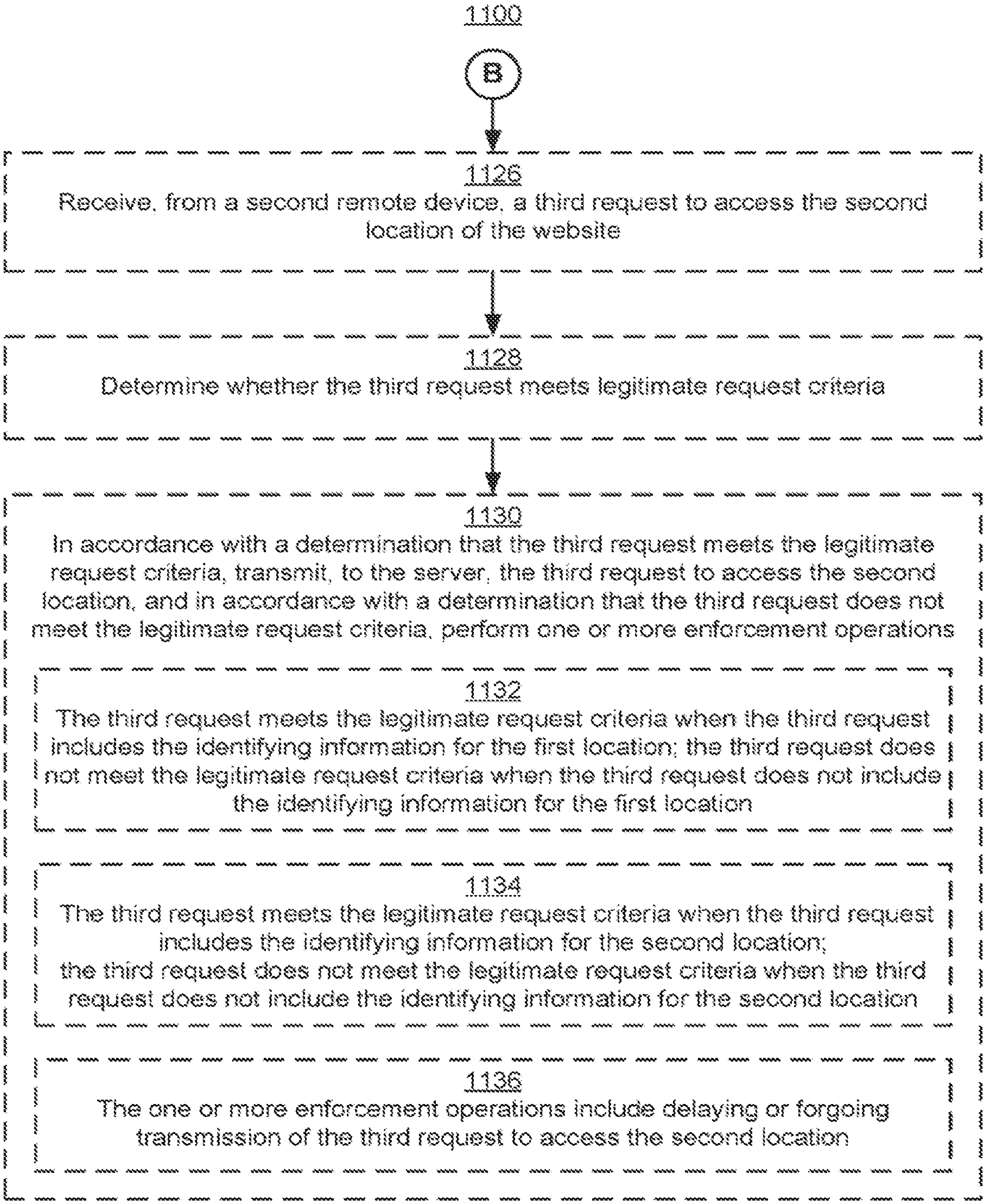

FIG. 11C

1126
Receive, from a second remote device, a third request to access the second location of the website 1128
Determine whether the third request meets legitimate request criteria 1130
In accordance with a determination that the third request meets the legitimate request criteria, transmit, to the server, the third request to access the second location, and in accordance with a determination that the third request does not meet the legitimate request criteria, perform one or more enforcement operations 1132
The third request meets the legitimate request criteria when the third request includes the identifying information for the first location; the third request does not meet the legitimate request criteria when the third request does not include the identifying information for the first location 1134
The third request meets the legitimate request criteria when the third request includes the identifying information for the second location;
the third request does not meet the legitimate request criteria when the third request does not include the identifying information for the second location 1136
The one or more enforcement operations include delaying or forgoing transmission of the third request to access the second location

Figure 11D:
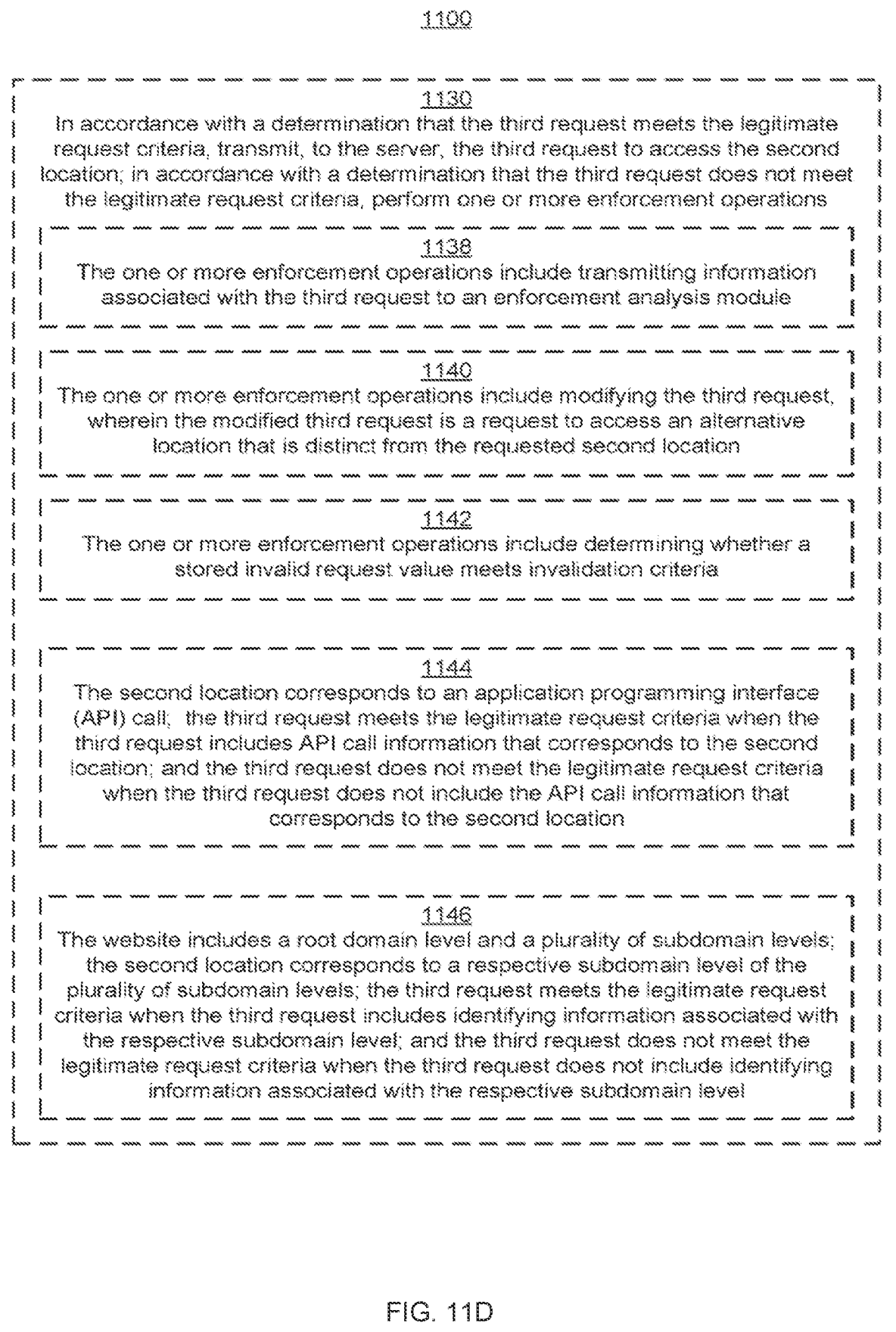

1100

1130
In accordance with a determination that the third request meets the legitimate request criteria, transmit, to the server, the third request to access the second location; in accordance with a determination that the third request does not meet the legitimate request criteria, perform one or more enforcement operations 1138
The one or more enforcement operations include transmitting information associated with the third request to an enforcement analysis module 1140
The one or more enforcement operations include modifying the third request, wherein the modified third request is a request to access an alternative location that is distinct from the requested second location 1142
The one or more enforcement operations include determining whether a stored invalid request value meets invalidation criteria 1144
The second location corresponds to an application programming interface (API) call; the third request meets the legitimate request criteria when the third request includes API call information that corresponds to the second location; and the third request does not meet the legitimate request criteria when the third request does not include the API call information that corresponds to the second location 1146
The website includes a root domain level and a plurality of subdomain levels; the second location corresponds to a respective subdomain level of the plurality of subdomain levels; the third request meets the legitimate request criteria when the third request includes identifying information associated with the respective subdomain level; and the third request does not meet the legitimate request criteria when the third request does not include identifying information associated with the respective subdomain level

1148
The first cookie includes first time information; the second cookie includes second time information; and in response to receiving the second cookie, store the second time information.

1150
Storing the identifying information for the first location and the second location includes storing a hash of the second cookie

1200

1202
Establishing, during a training phase, a set of one or more valid access patterns for a website, wherein a respective valid access pattern of the set of one or more valid access patterns includes information that corresponds to one or more locations of the website 1204
Receiving, from a remote device, a request to access a first location of a website 1206
Determining, using the set of one or more valid access patterns, whether the request to access the first location of the website is a valid request 1208
In accordance with a determination that the request to access the first location of the website is a valid request, transmitting the request to the server 1210
In accordance with a determination that the request to access the first location of the website is not a valid request, performing one or more enforcement operations

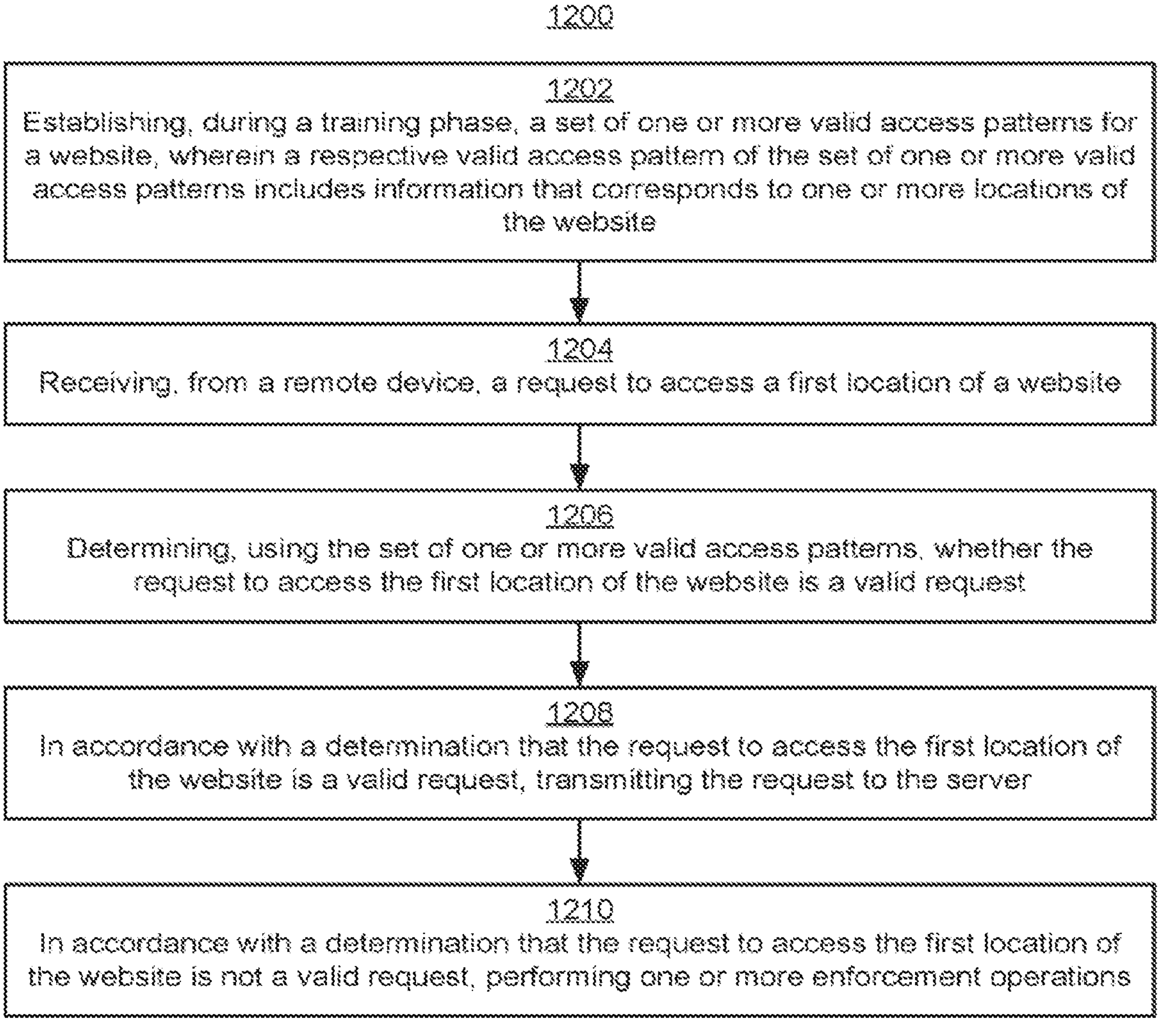

FIG. 12

PROVIDING APPLICATION SECURITY USING CAUSAL GRAPH

TECHNICAL FIELD

This application relates generally to validating access to a location of a website, and more particularly to validating website access using cookies to store information about access to website locations.

BACKGROUND

There is a need to identify requests that would result in undesirable access to websites. Undesirable access to a website includes, for example, Denial of Service (DoS) and Distributed Denial of Service (DDoS) attacks that overload a target resource with superfluous traffic to reduce or eliminate legitimate requests of the target resource.

An illustrative DoS attack sends a flood of requests for a website location, when the content of the location is resource intensive for a server to deliver. Typically, the server manages traffic by providing access to particular locations via an established path through locations of the website or other defined access pattern. A flood of requests that bypasses the established path or pattern can tax website resources beyond a server's capacity to respond to the requests, causing the website to shut down.

There is a need for systems that manage requests for website locations to avoid undesirable access to websites.

SUMMARY

Without limiting the scope of the appended claims, after considering this disclosure, and particularly after considering the section entitled "Detailed Description," one will understand how the aspects of various embodiments are used to update a task component status.

In some embodiments, a method for storing a first path profile includes receiving, from a first remote device, a first request to access a first location of a website. The first request to access the first location is transmitted to a server that corresponds to the website. A first cookie that includes identifying information for the first location is received from the server. In response to receiving the first cookie, the identifying information for the first location is stored. A second request to access a second location of the website is received from the first remote device. The second location is distinct from the first location, and the second request includes the identifying information for the first location. The second request to access the second location is transmitted to the server. A second cookie that includes the identifying information for the first location and the identifying information for the second location is received from the server. In response to receiving the second cookie, the first path profile that includes the identifying information for the first location and the identifying information for the second location is stored.

In some embodiments, a system for storing a first path profile includes a memory and one or more programs. The one or more programs are stored in the memory and are configured to be executed by the one or more processors. The one or more programs include instructions for receiving, from a first remote device, a first request to access a first location of a website. The one or more programs also include instructions for transmitting, to a server that corresponds to the website, the first request to access the first location. The one or more programs also include instructions for receiving, from the server, a first cookie that includes identifying information for the first location. The one or more programs also include instructions for storing the identifying information for the first location in response to receiving the first cookie. The one or more programs also include instructions for receiving, from the first remote device, a second request to access a second location of the website, wherein the second location is distinct from the first location, and the second request includes the identifying information for the first location. The one or more programs also include instructions for transmitting, to the server, the second request to access the second location. The one or more programs also include instructions for receiving, from the server, a second cookie that includes the identifying information for the first location and identifying information for the second location. The one or more programs also include instructions for storing the first path profile that includes the identifying information for the first location and the identifying information for the second location in response to receiving the second cookie.

In some embodiments, a computer readable storage medium stores one or more programs. The one or more programs comprise instructions, which when executed, cause the device to receive, from a first remote device, a first request to access a first location of a website. The one or more programs also include instructions for transmitting, to a server that corresponds to the website, the first request to access the first location. The one or more programs also include instructions for receiving, from the server, a first cookie that includes identifying information for the first location. The one or more programs also include instructions that cause the device to store the identifying information for the first location in response to receiving the first cookie. The one or more programs also include instructions that cause the device to receive, from the first remote device, a second request to access a second location of the website, wherein the second location is distinct from the first location, and the second request includes the identifying information for the first location. The one or more programs also include instructions that cause the device to transmit, to the server, the second request to access the second location. The one or more programs also include instructions that cause the device to receive, from the server, a second cookie that includes the identifying information for the first location and identifying information for the second location. The one or more programs also include instructions that cause the device to store the first path profile that includes the identifying information for the first location and the identifying information for the second location in response to receiving the second cookie.

In some embodiments, a method for validating a request for a location of a website includes establishing, during a training phase, a set of one or more valid access patterns for a website. A respective valid access pattern of the set of one or more valid access patterns includes information that corresponds to one or more locations of the website. The method also includes receiving, from a remote device, a request to access a first location of a website. The method also includes determining, using the set of one or more valid access patterns, whether the request to access the first location of the website is a valid request. The method also includes, in accordance with a determination that the request to access the first location of the website is a valid request, transmitting the request to the server. The method also includes, in accordance with a determination that the request to access the first location of the website is not a valid request, performing one or more enforcement operations.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIGS. 11A-11E are flow diagrams illustrating a method for storing a path profile, in accordance with some embodiments.

FIG. 12 is a flow diagram illustrating a method for validating a request for a location of a website, in accordance with some embodiments.

In accordance with common practice, some of the drawings may not depict all of the components of a given system, method or device. Finally, like reference numerals may be used to denote like features throughout the specification and figures.

DETAILED DESCRIPTION

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not been described in exhaustive detail so as not to unnecessarily obscure pertinent aspects of the embodiments described herein.

A proxy intercepts requests for website locations (e.g., pages of a website). The proxy stores cookies that include identifying information for the requested locations. The identifying information in the stored cookies is used by the proxy to establish legitimate request criteria. The proxy determines the legitimacy of incoming requests for website locations using the established legitimate request criteria. If an incoming request does not meet the established legitimate request criteria, the proxy applies specialized handling to the incoming request (e.g., including denying access to the requested location). By denying access to illegitimate requests (e.g., requests that do not include information that corresponds to information in the cookies stored by the proxy), the proxy can prevent a denial of service attack. For example, if a bot requests direct access to a location of a website without traversing a typical path through the website to the requested location, the proxy can determine that the requested access is illegitimate.

Figure 1:
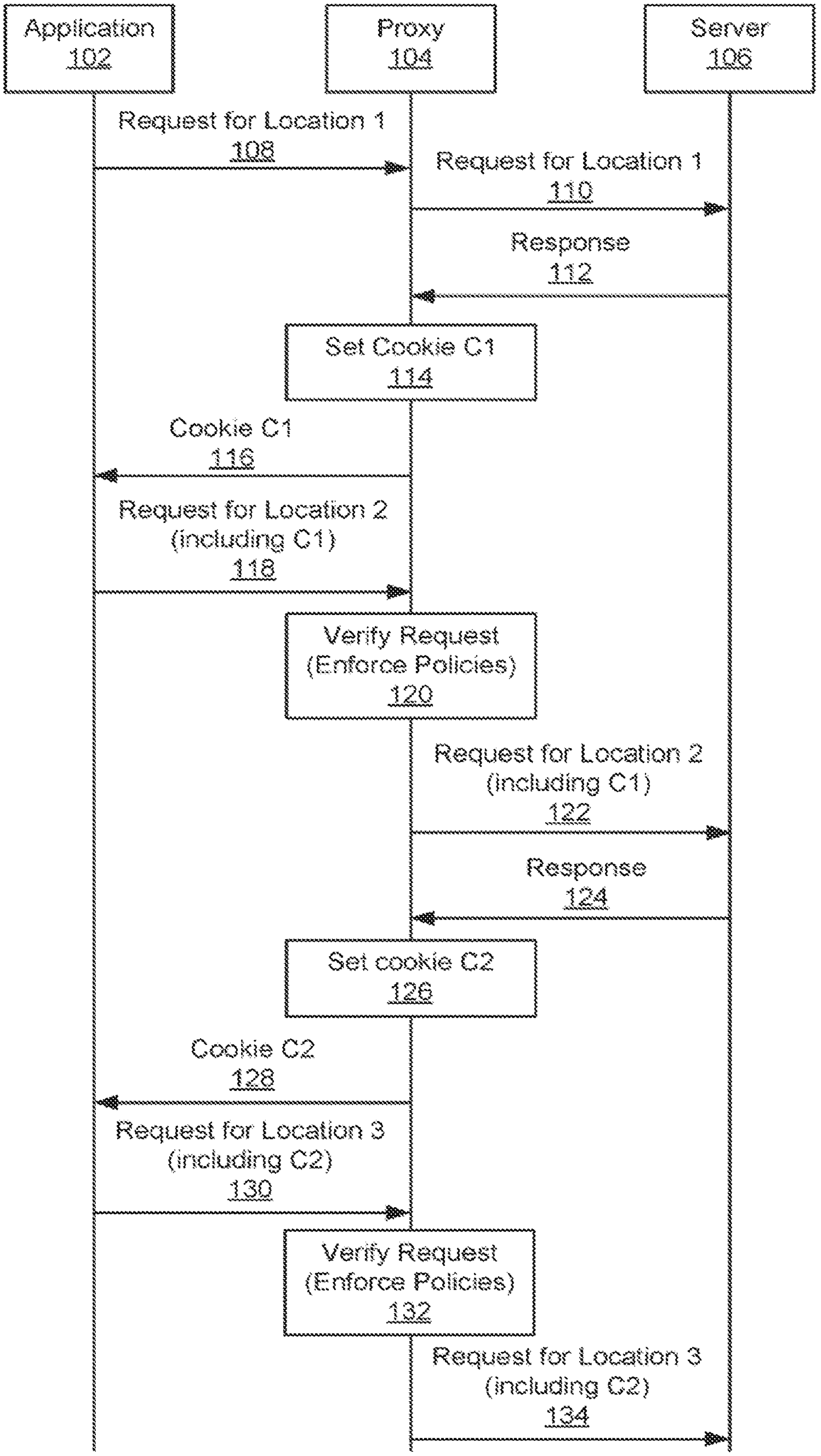
FIG. 1 illustrates a sequence diagram that indicates communications between an application, a proxy, and a server, in accordance with some embodiments.
Figure 3:
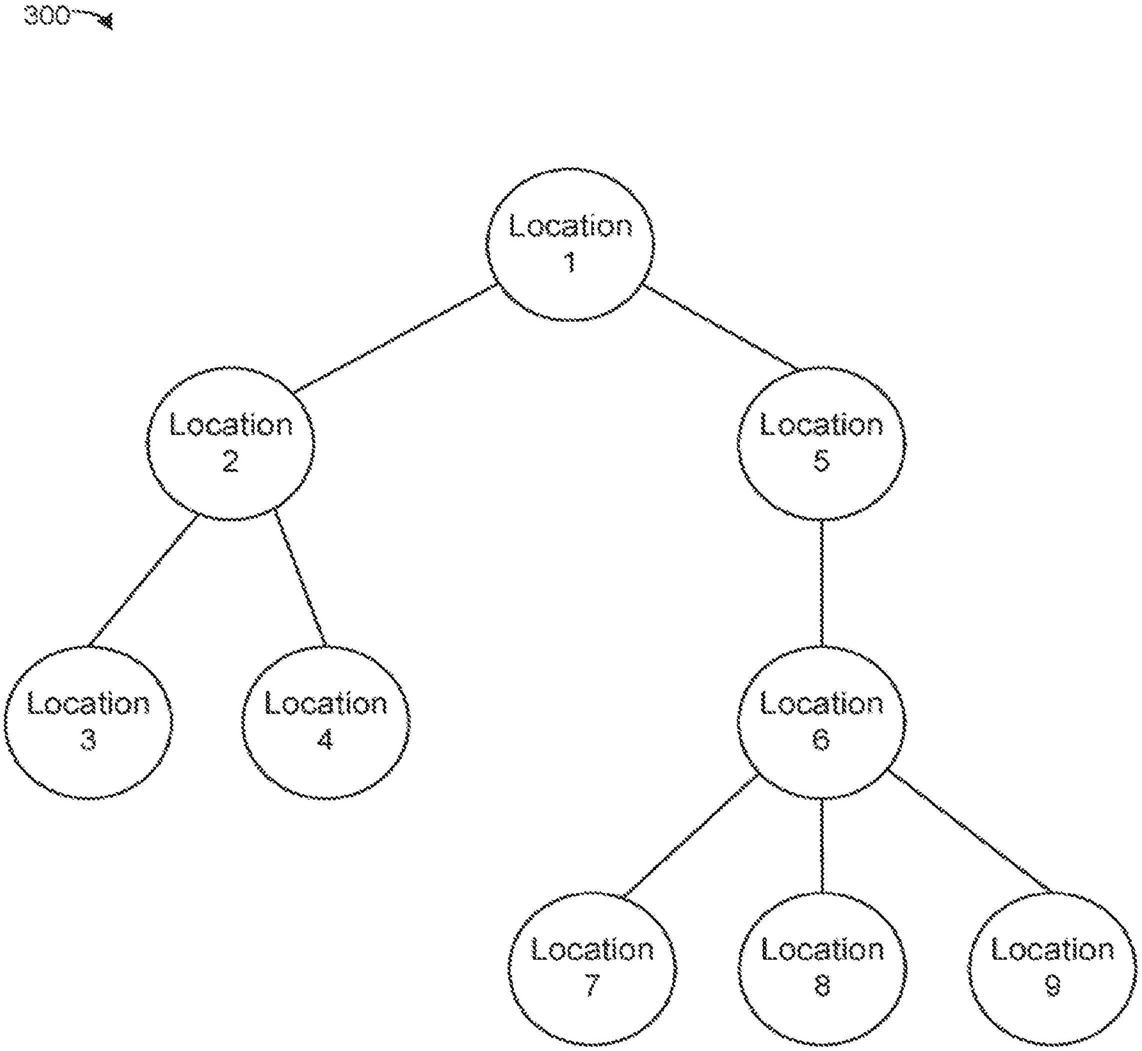
FIG. 3 illustrates a structure of a website that includes a root domain and sub-domains, in accordance with some embodiments.

FIG. 1 illustrates a sequence diagram that indicates communications between an application 102 (e.g., executing on a user device 246), a proxy 104 (e.g., a device that is distinct from the user device), and a server 106 (e.g., a device that is remote from the user device 246 and the proxy device 104 and that hosts part or all of a website), in accordance with some embodiments. At operation 108, application 102 generates a request for a location 1 (e.g., as shown in FIG. 3) of a website. A location is, e.g., a uniform resource locator (URL), such as an application programming interface (API) call, that corresponds to the website. The request for location 1 is transmitted by application 102 and received by proxy 104. At operation 110, proxy 104 forwards the request for location 1 to a server 106. At operation 112, server 106 generates a response to the request for location 1 of the website (e.g., by sending data that corresponds to location 1 of the website). At operation 114, proxy 104 sets a cookie C1 (e.g., that includes an indication that server 106 responded to the request for location 1 and/or includes information that corresponds to location 1). In some embodiments, the response includes a cookie from server 106 (e.g., a cookie that includes information about location 1), and cookie C1 is the cookie from server 106 or includes information from the cookie from server 106. Optionally, at operation 116, proxy 104 transmits cookie C1 to application 102.

At operation 118, application 102 generates a request for a location 2 (e.g., as shown in FIG. 3) of a website. In some embodiments, the request for location 2 includes cookie C1. The request for location 2 is transmitted by application 102 and received by proxy 104. At operation 120, proxy 104 verifies the request for location 2 of the website. In some embodiments, to verify the request for location 2, proxy 104 enforces one or more policies for access to the website. For example, proxy 104 determines whether a cookie C1 (indicating that a request for location 1 occurred prior to the request for location 2) is present in the request for location 2 (e.g., to determine whether application 102 is generating requests for locations of the website in accordance with an acceptable path). At operation 122, in accordance with a determination that the request for location 2 is valid, proxy 104 forwards the request for location 2 to server 106. In some embodiments, the request for location 2 includes at least a portion of the information from cookie C1. At operation 124, server 106 generates a response to the request for location 2 of the website (e.g., by sending data that corresponds to location 2 of the website). At operation 126, proxy 104 sets a cookie C2 (e.g., that includes an indication that server 106 responded to the request for location 2). In some embodiments, cookie C2 includes at least a portion of information from cookie C1. In some embodiments, the response includes a cookie from server 106 (e.g., a cookie that includes information about location 2), and cookie C2 is the cookie from server 106 or includes information from the cookie from server 106. Optionally, at operation 128, proxy 104 transmits cookie C2 to application 102.

At operation 130, application 102 generates a request for a location 3 (e.g., as shown in FIG. 3) of a website. In some embodiments, the request for location 3 includes cookie C2. The request for location 3 is transmitted by application 102 and received by proxy 104. At operation 132, proxy 104 verifies the request for location 3 of the website. In some embodiments, to verify the request for location 3, proxy 104 enforces one or more policies for access to the website. For example, proxy 104 determines whether a cookie C2 (which, in some embodiments, must include at least some information from cookie C1), indicating that a request for location 1 and/or a request for location 2 occurred prior to the request for location 3, is present in the request for location 3 (e.g., to determine whether application 102 is generating requests for locations of the website in accordance with an acceptable path). At operation 134, in accordance with a determination that the request for location 3 is valid, proxy 104 forwards the request for location 3 to server 106. In some embodiments, the request for location 3 includes at least a portion of the information from cookie C2.

In some embodiments, requests for locations 1-3 correspond to a set of API calls that typically occur (and/or are required to occur) in a particular sequence.

In some embodiments, request verification is performed only after a predefined number of cookies have been set by proxy 104. For example, the verification described with regard operation 120 is not performed, and the initial request verification is performed at operation 132, after a second cookie C2 has been set.

In some embodiments, (e.g., when a request for a location is received by proxy 104 from an application 102, as shown at 108, or when a response to a request is sent by server 106 to proxy 104, as shown at 112) proxy 104 stores a cookie C1 in association with identifying information for a requestor (e.g., identifying information for application 102 and/or identifying information for a device, such as user device 246 or user device 248, that executes application 102). For example, C1 is stored in association with the identifying information for the requestor in a database structure that creates a logical link between the cookie CI and the identifying information. In some embodiments, when a request for location 2 is generated by application 102 (with or without a cookie C1), proxy 104 determines whether a cookie CI is stored in association with identifying information for the requestor.

Figure 2:
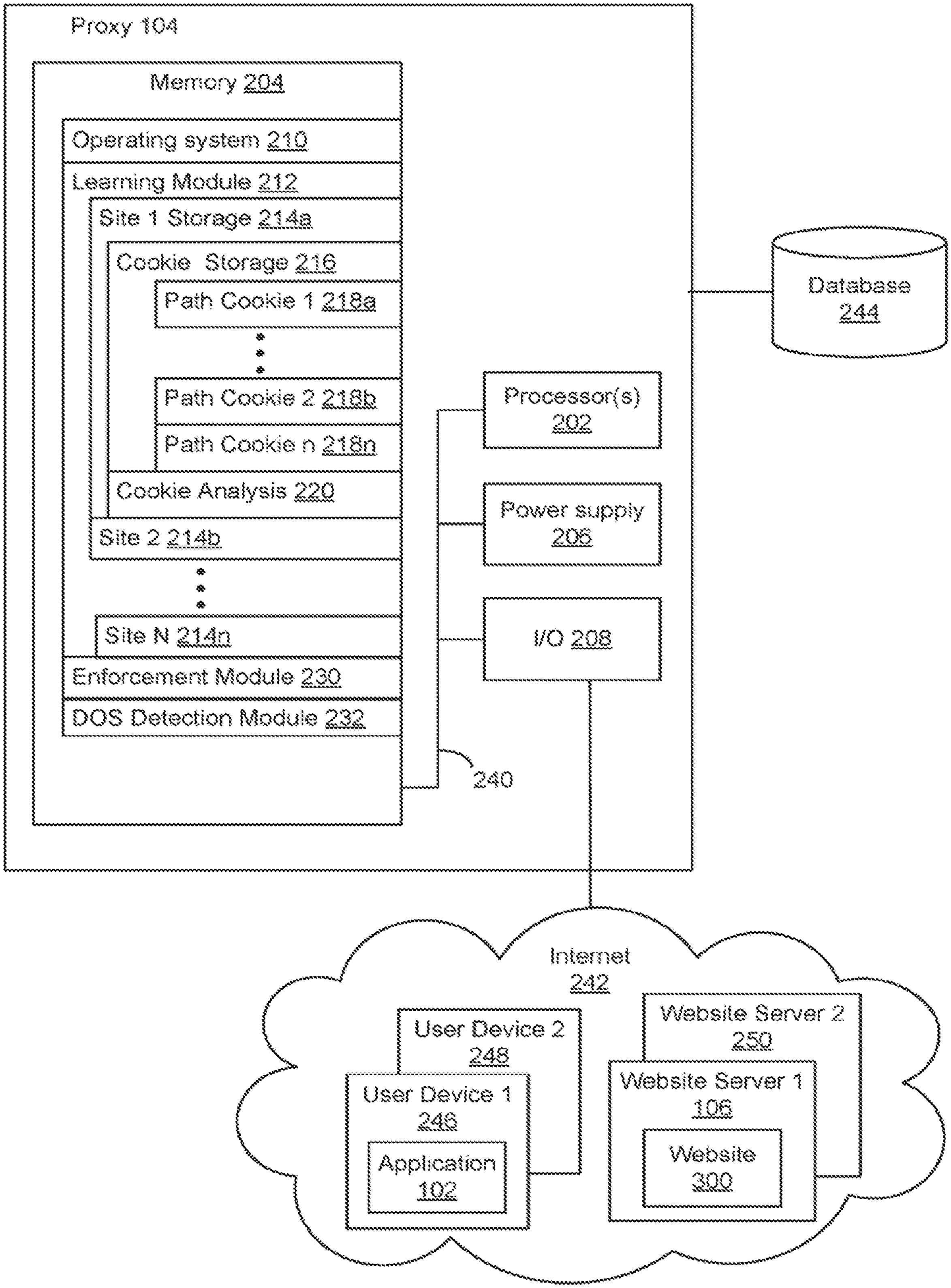
FIG. 2 illustrates a system diagram of a proxy device, in accordance with some embodiments.

FIG. 2 is a system diagram of proxy device 104, in accordance with some embodiments. Proxy device 104 typically includes one or more processor(s) 202, a memory 204, a power supply 206, an input/output (I/O) subsystem 208, and a communication bus 240 for interconnecting these components.

Processor(s) 202 execute modules, programs and/or instructions stored in memory 204 and thereby perform processing operations.

In some embodiments, the memory 204 stores one or more programs (e.g., sets of instructions) and/or data structures, collectively referred to as "modules" herein. In some embodiments, memory 204, or the non-transitory computer readable storage medium of memory 204, stores the following programs, modules, and data structures, or a subset or superset thereof:

- operating system 210;
- learning module 212, which performs learning operations (e.g., storing information for one or more websites 300 in site storage 214 (214*a*, 214*b*, 214*n*), storing cookies that corresponds to websites in cookie storage 216, and/or performing cookie analysis for a site using cookie analysis module 220);
- storage for data associated with one or more websites 214 (e.g., site 214*a*, site 214*b*, and site 214*n*);
- cookie storage 216 for data associated with one or more cookies 216 set by websites 214 (e.g., cookie 218*a*, cookie 218*b*, and cookie 218*n*) cookie analysis module 220, which performs cookie analysis operations (e.g., analyzing path profiles, generating path patterns, determining frequencies of path patterns, determining valid API call sequences, and/or determining sets of valid access patterns);
- enforcement module 230, which performs enforcement operations (e.g., delaying or forgoing transmission of a request to access a website location, and/or modifying a request for a website location); and DOS detection module 232, which performs DOS detection operations (e.g., determining whether a number of invalid requests meet invalidation criteria).

The above identified modules (e.g., data structures, and/or programs including sets of instructions) need not be implemented as separate software programs, procedures, or modules, and thus various subsets of these modules may be combined or otherwise re-arranged in various embodiments. In some embodiments, memory 204 stores a subset of the modules identified above. In some embodiments, a database 244 (e.g., a local database and/or a remote database) stores one or more modules identified above. Furthermore, the memory 204 may store additional modules not described above. In some embodiments, the modules stored in memory 204, or a non-transitory computer readable storage medium of memory 204, provide instructions for implementing respective operations in the methods described below. In some embodiments, some or all of these modules may be implemented with specialized hardware circuits that subsume part or all of the module functionality. One or more of the above identified elements may be executed by one or more of processor(s) 202.

I/O subsystem 208 communicatively couples proxy device 104 to one or more devices such as website servers (e.g., 106, 250) and/or one or more user devices (e.g., 246, 248). In some embodiments, the one or more devices are accessed via a communications network 242 (e.g., the Internet) via a wired and/or wireless connection. Website server 106 includes one or more computing devices that host at least a portion of a website 300. In some embodiments, one or more modules described with regard to memory 204 are stored by website server 106. For example, in some embodiments, proxy device 104 is the same device as one or more computing devices of website server 106 and/or the proxy is implemented on the website server 106.

Communication bus 240 optionally includes circuitry (sometimes called a chipset) that interconnects and controls communications between system components.

FIG. 3 is a diagram illustrating a structure of a website 300 that includes multiple locations. Location 1 is a root domain with sub-domains (location 2 and location 5). Location 2 has sub-sub-domains (location 3 and location 4) and location 5 has a sub-sub-domain (location 6). Location 6 has sub-sub-sub-domains (location 7, location 8, and location 9).

Figure 4:
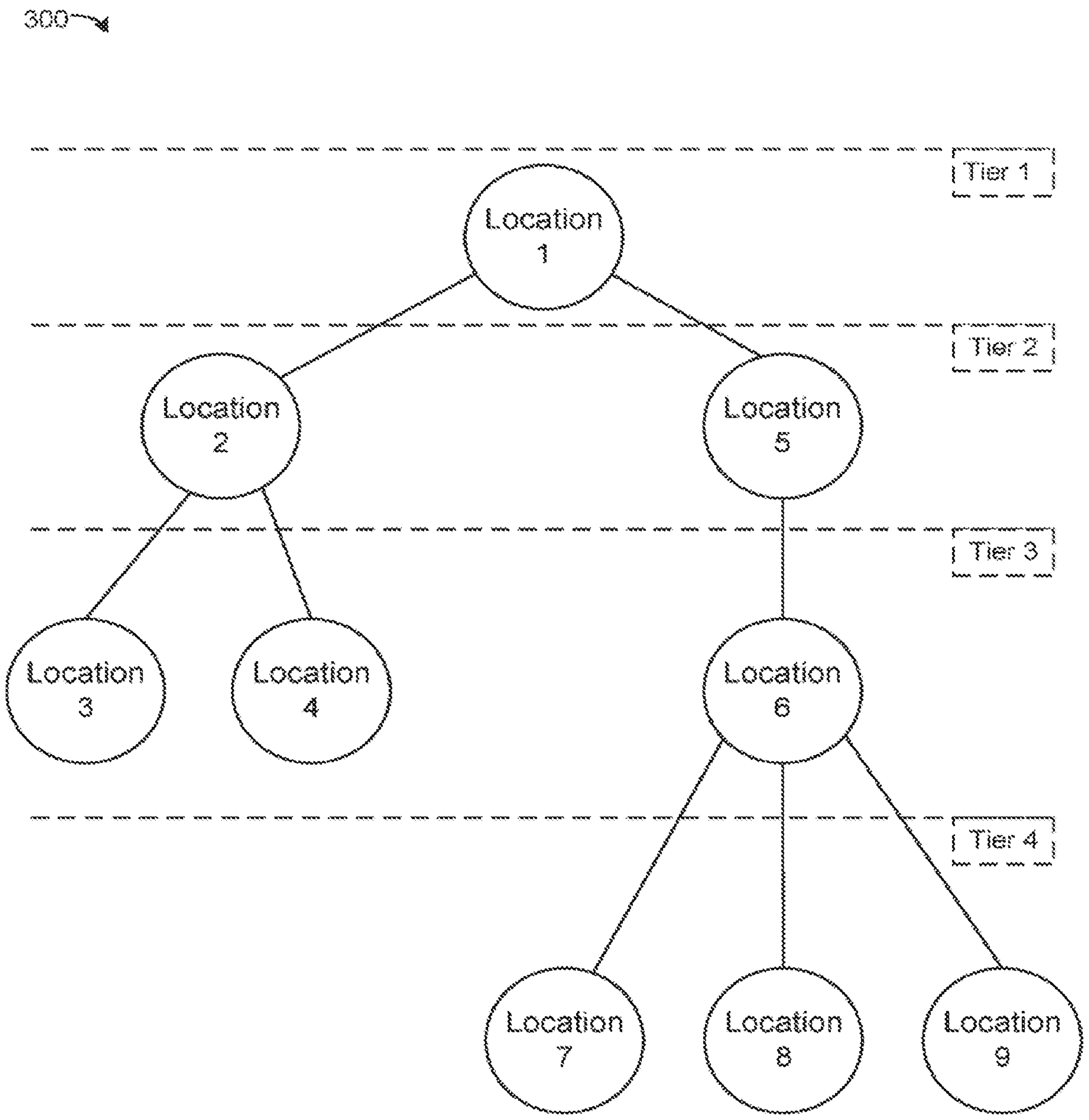
FIG. 4 illustrates tiers of a website, in accordance with some embodiments.

FIG. 4 illustrates tiers (e.g., tiers 1-4) of the locations of website 300, in accordance with some embodiments. For example, tier 1 includes root domain 1. Tier 2 includes sub-domains (location 2 and location 5) of the root domain. Tier 3 includes sub-sub-domains (locations 3, 4, and 6). Tier 4 includes sub-sub-sub-domains (locations 7, 8, and 9). In some embodiments, a request for a location by application 102 must traverse a legitimate path through the tiers (e.g., a request for a location in tier 3 must follow a request for a location in tier 2, which must in turn follow a request for a location in tier 1). Cookies, such as C1 and C2 (discussed with regard to FIG. 1) are used to determine whether a series of requests for locations of a website 300 follow a legitimate path. In some embodiments, a cookie C1 is set for a request for the location in tier 1, a cookie C2 is set for a request for any location in tier 2, a cookie C3 is set for a request for any location in tier 3, and so on for cookies Cn and corresponding tiers. In an illustrative example, when a request is received for a location in tier 4, proxy 104 determines whether information from cookies that correspond to one or more prior tiers (e.g., C1, C2, and/or C3) are available (e.g., available in the request received from application 102 and/or previously stored by proxy 104 in connection with previous requests from application 102), and, if the required information from cookies for the one or more prior tiers is not available, the request is denied (e.g., proxy 104 does not forward the request to server 106).

Figure 5A:
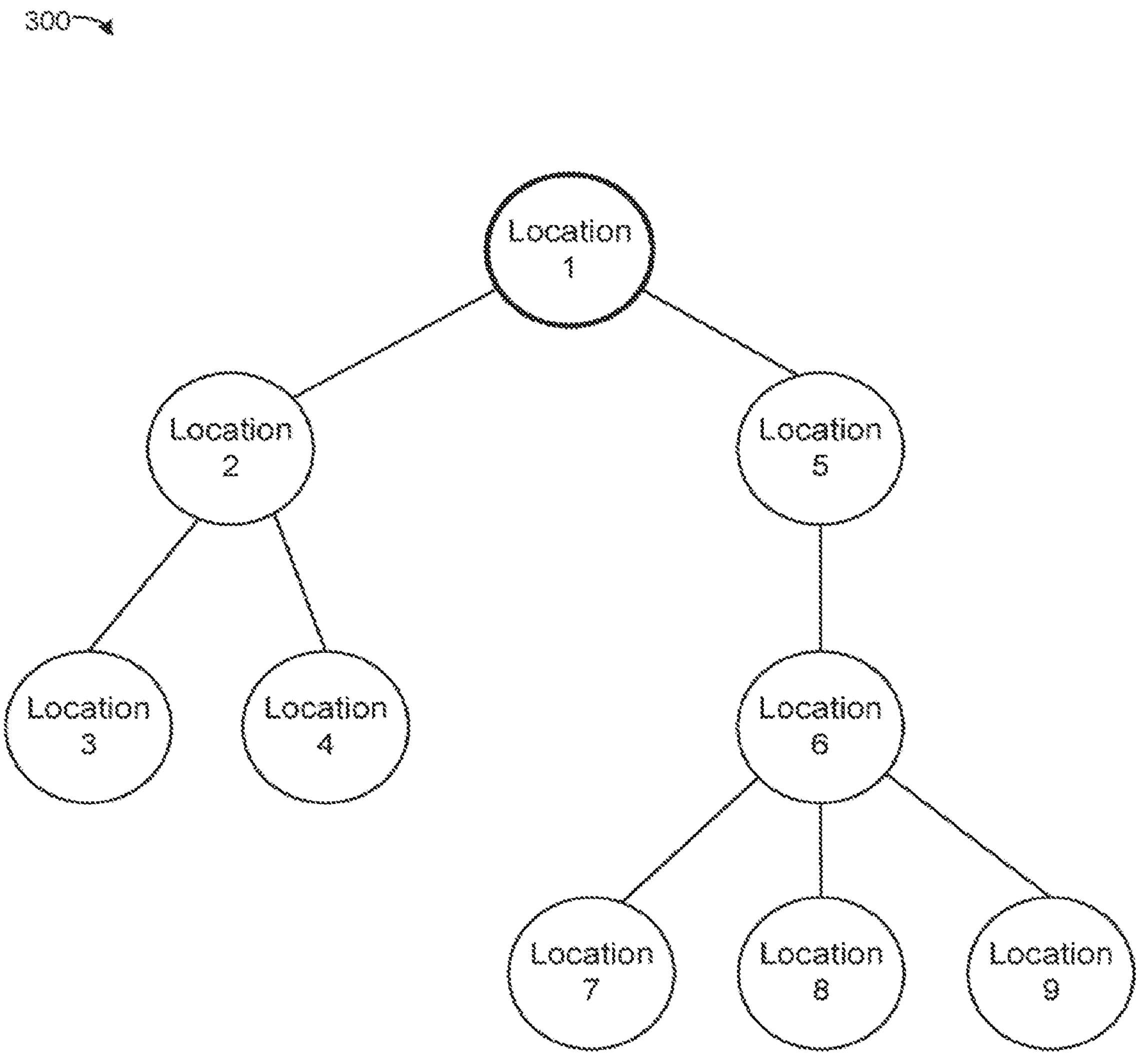
FIGS. 5A, 6A, 7A, and 8A illustrate access by an application to website locations, in accordance with some embodiments.
Figure 5B:
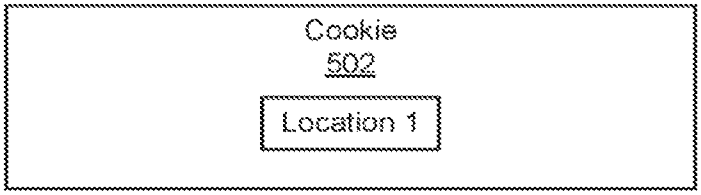
FIGS. 5B, 6B, 7B, and 8B illustrate structures of cookies set by a proxy device, in accordance with some embodiments.

FIG. 5A illustrates access by an application 102 to location 1 of a website 300. FIG. 5B illustrates a cookie 502 (e.g., cookie C1) that is set by proxy 104 when application 102 accesses location 1 of the website 300. Cookie 502 includes identifying information for location 1 of website 300.

Figure 6A:
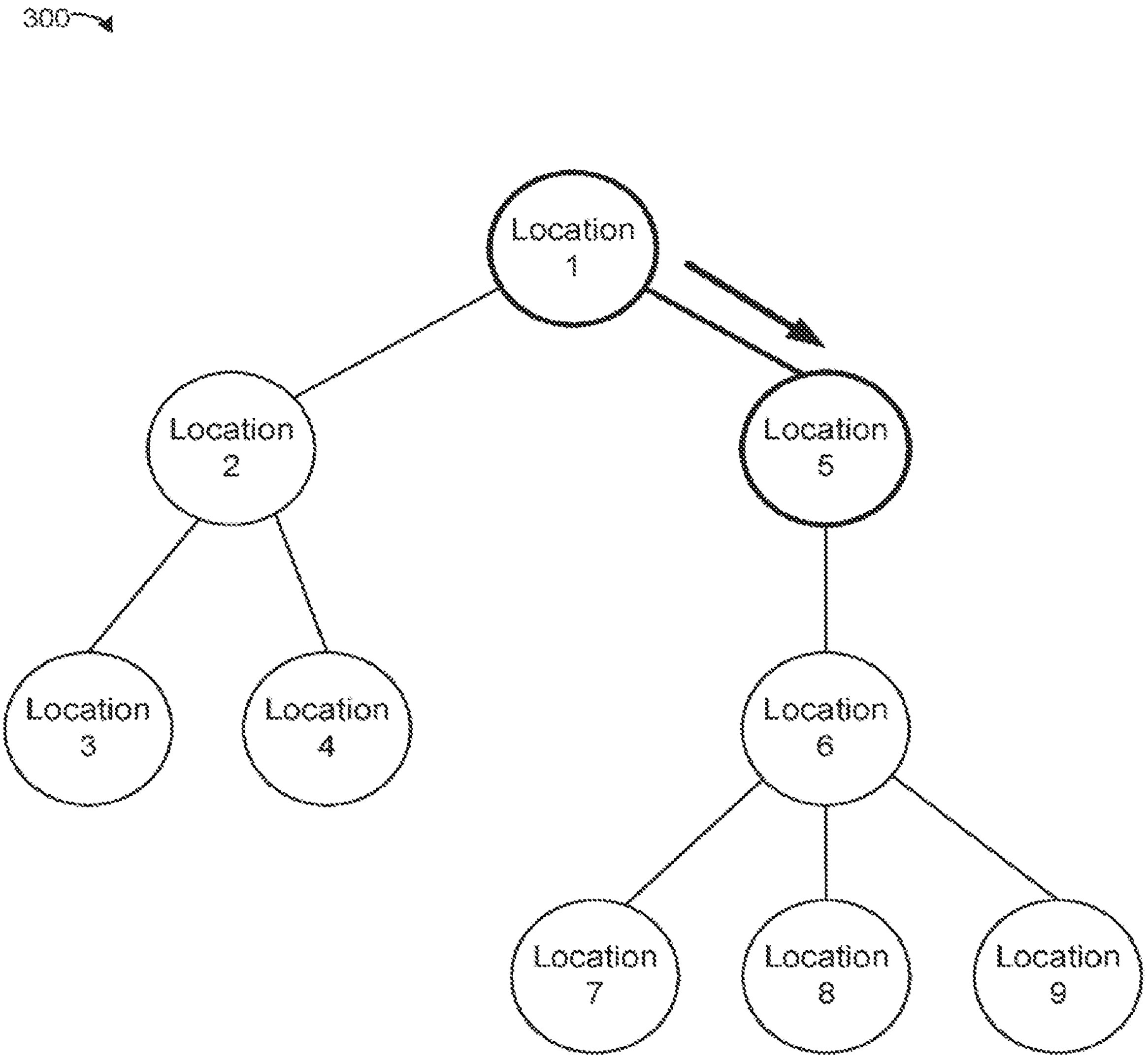
Figure 6B:
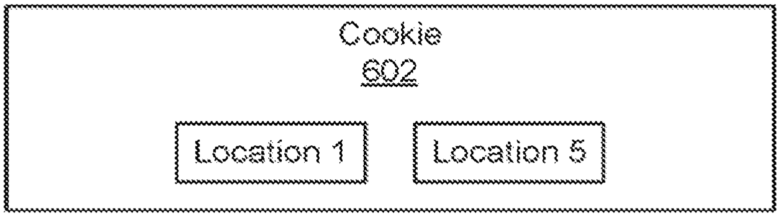

FIG. 6A illustrates access by an application 102 to location 5 of website 300, subsequent to the access of location 1 of the website 300 by application 102. FIG. 6B illustrates a cookie 602 (e.g., cookie C2) that is set by proxy 104 (e.g., after application 102 requests access to location 5 of the website 300). Cookie 602 includes identifying information for location 1 and location 5 of website 300.

Figure 7A:
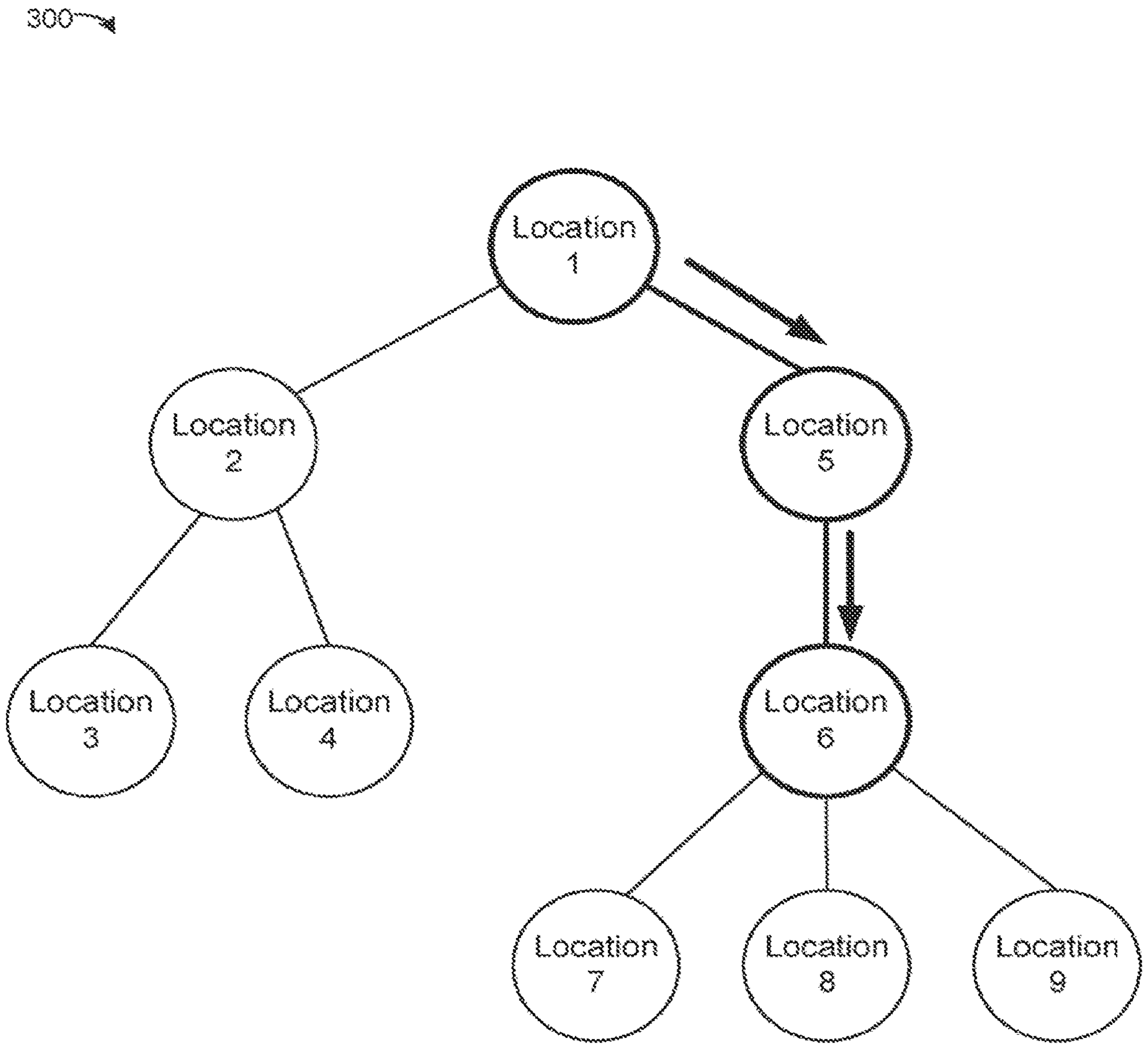
Figure 7B:

FIG. 7A illustrates access by an application 102 to location 6 of website 300, subsequent to the access of location 5 of the website 300 by application 102. FIG. 7B illustrates a cookie 702 that is set by proxy 104 (e.g., after application 102 requests access to location 6 of the website 300). Cookie 702 includes identifying information for location 1, location 5, and location 6 of website 300.

Figure 8A:
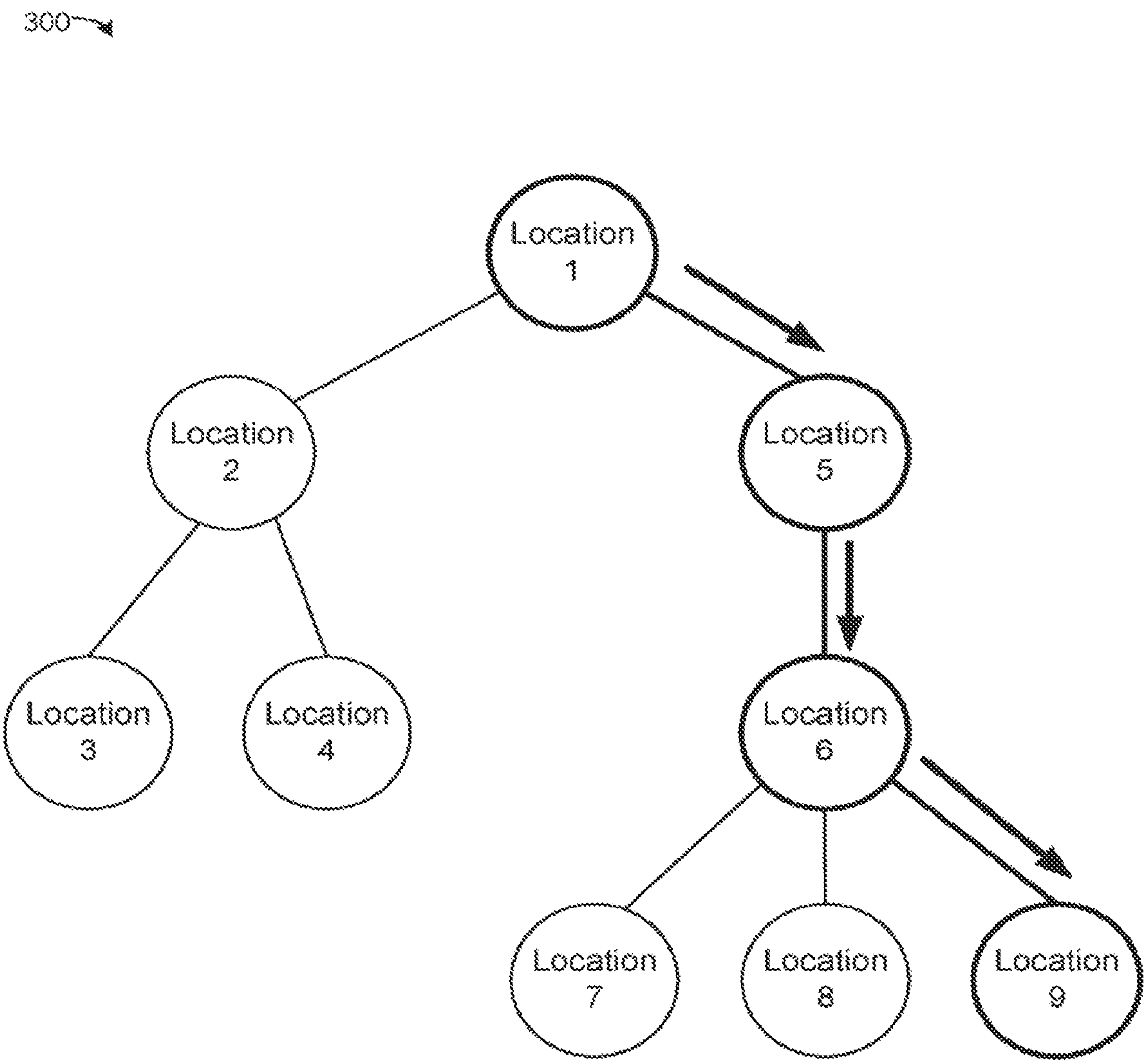
Figure 8B:
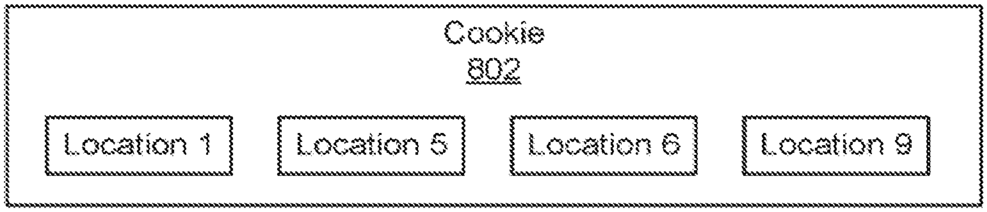

FIG. 8A illustrates access by an application 102 to location 9 of website 300, subsequent to the access of location 6 of the website 300 by application 102. FIG. 8B illustrates a cookie 802 that is set by proxy 104 (e.g., after application 102 requests access to location 9 of the website 300). Cookie 802 includes identifying information for location 1, location 5, location 6, and location 9 of website 300.

Figure 9:
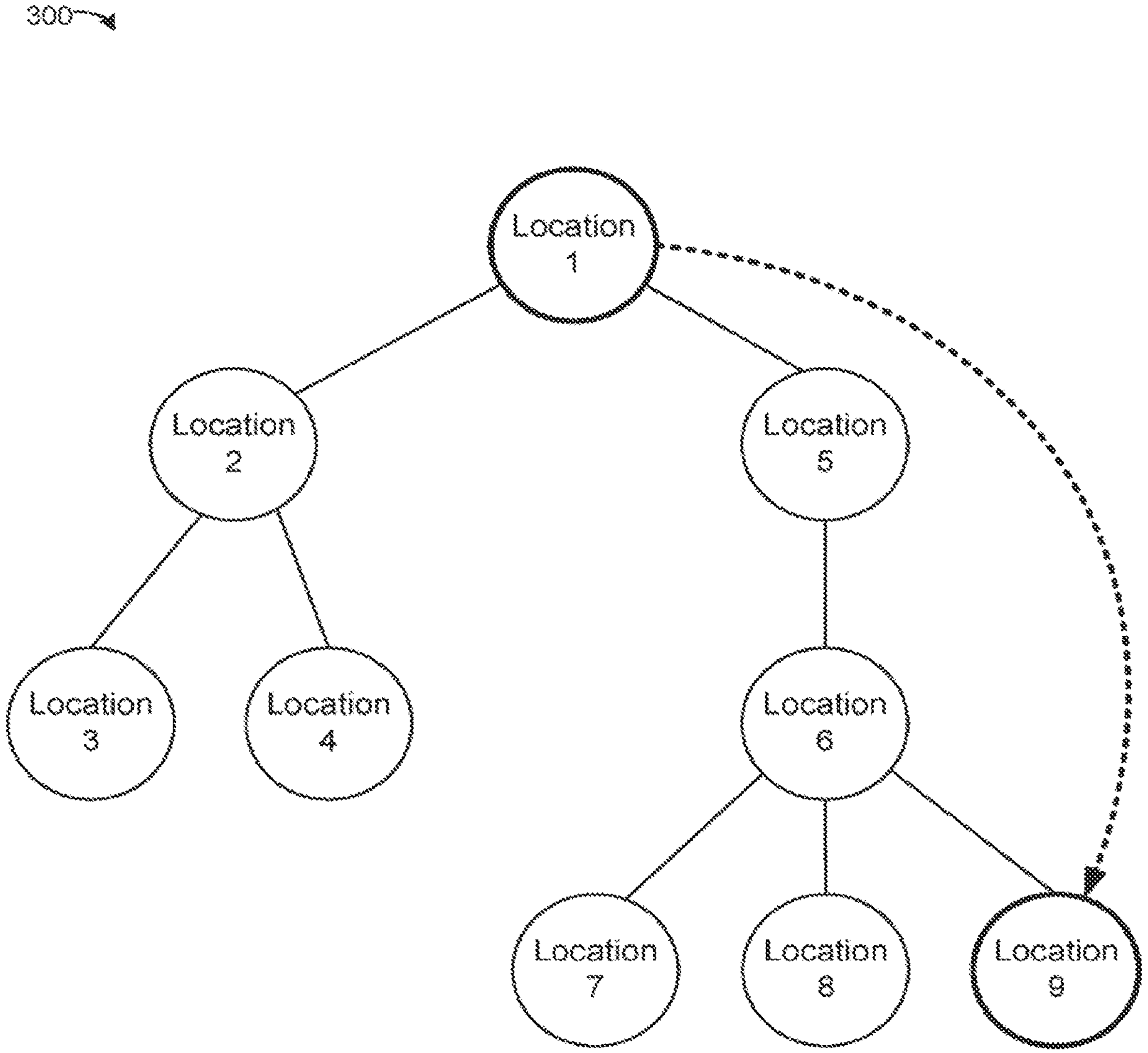
FIG. 9 illustrates an illegitimate request for access to a website location, in accordance with some embodiments.

FIG. 9 illustrates an illegitimate request for access to location 9 of website 300 directly following a request for access to location 1 of website 300. In some embodiments, legitimate access to location 9 of website 300 requires a path that includes sequential access to location 1, location 5, location 6, and location 9 of website 300. For example, proxy 104 performs a request verification operation to determine whether a request to access location 9 includes information that indicates traversal of a legitimate path (e.g., via location 1, location 5, location 6, and location 9). In some embodiments, the request verification operation includes a determination of whether a cookie (e.g., cookie 802) that corresponds to the request (e.g., included in the request) includes required identifying information indicating a legitimate path (e.g., identifying information for location 1, location 5, location 6, and location 9). In some embodiments, the request verification operation includes a determination of whether a cookie that corresponds to the request follows a legitimate path pattern (e.g., includes identifying information indicating traversal of tier 1, tier 2, tier 3, and tier 4, as indicated in FIG. 4). In some embodiments, the request verification operation includes a determination of whether the cookie that corresponds to the request includes information indicating a required number of prior requests (e.g., a request for location 9 is the fourth request in a sequence of requests). In the illustrative example of FIG. 9, because the request for access to location 9 of website 300 directly follows a request for access to location 1 of website 300, proxy 104 determines that the request is illegitimate. In some embodiments, in response to determining that the request is illegitimate, proxy 104 does not forward the request to server 106.

In some embodiments, after one or more cookies (e.g., 502, 602, 702, and/or 802) are established, the one or more cookies are set by server 106 and/or proxy 104 (e.g., as cookie C1 described with regard to FIG. 1) in response to a request for a higher level domain. In this way, a cookie that indicates a valid path (e.g., as established during a training phase) is "bubbled" up to higher level domains (e.g., the root domain). For example, cookie 802 is established in response to a series of requests for locations of website 300 by an application 102 executing on a first user device 246. In response to a request for access to location 1 of the website 300 by application 102 executing on a second user device 248, cookie 802 is set. Subsequent requests for locations of the website by application 102 executing on the second user device 248 must meet verification requirements (e.g., follow a path or a path pattern) established based on cookie 802. In this way, a request for a website location or for a series of website locations is verified by proxy 104 using a cookie delivered by a server 106 to proxy 104 (e.g., in response to a request for access to a root domain, a sub-domain, or a sub-sub-domain). For example, a cookie set by proxy 104 upon access to any tier of a website is used to verify subsequent requests for locations of the website.

Figure 10:
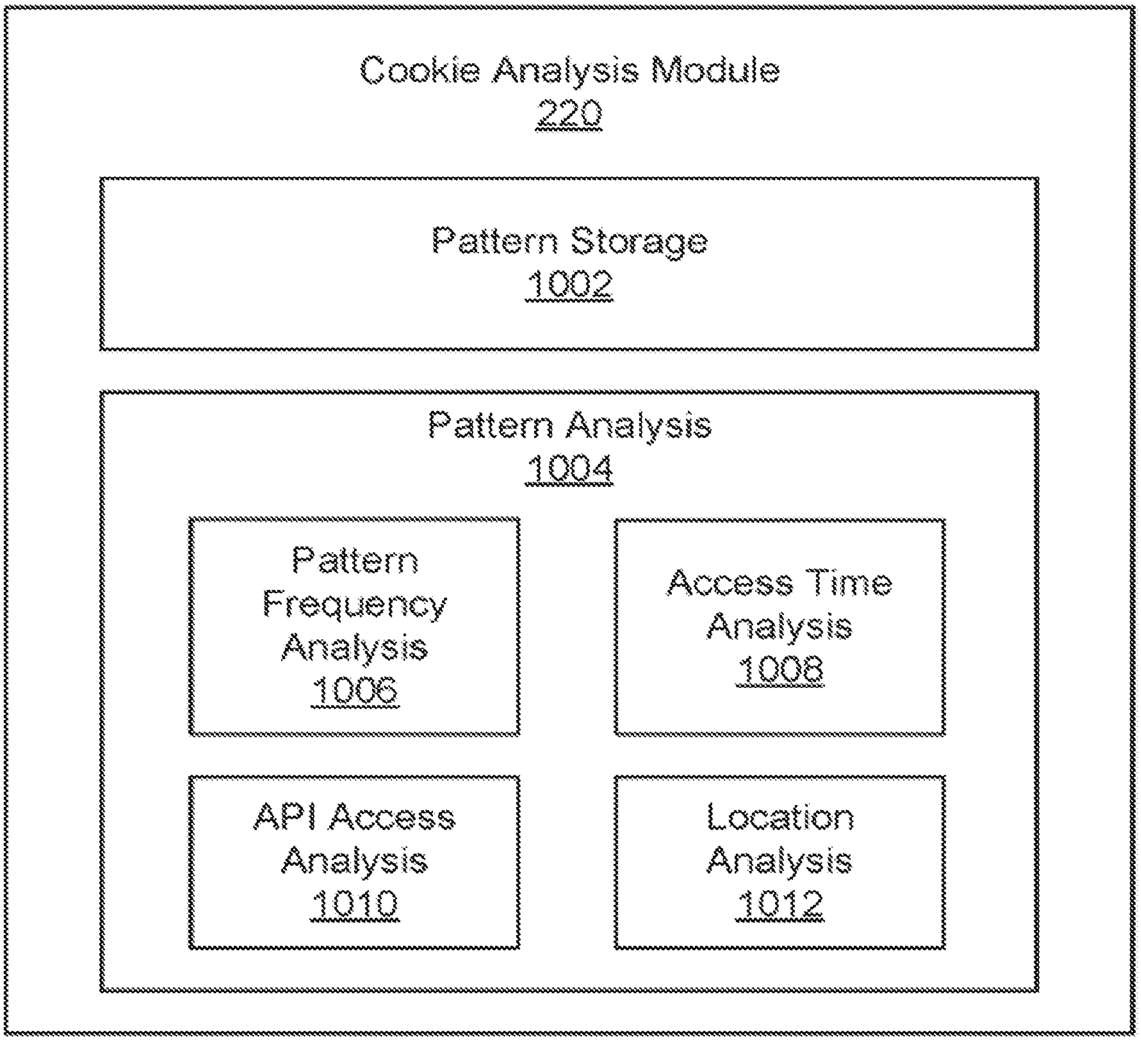
FIG. 10 illustrates a cookie analysis module, in accordance with some embodiments.
Figure 11E:
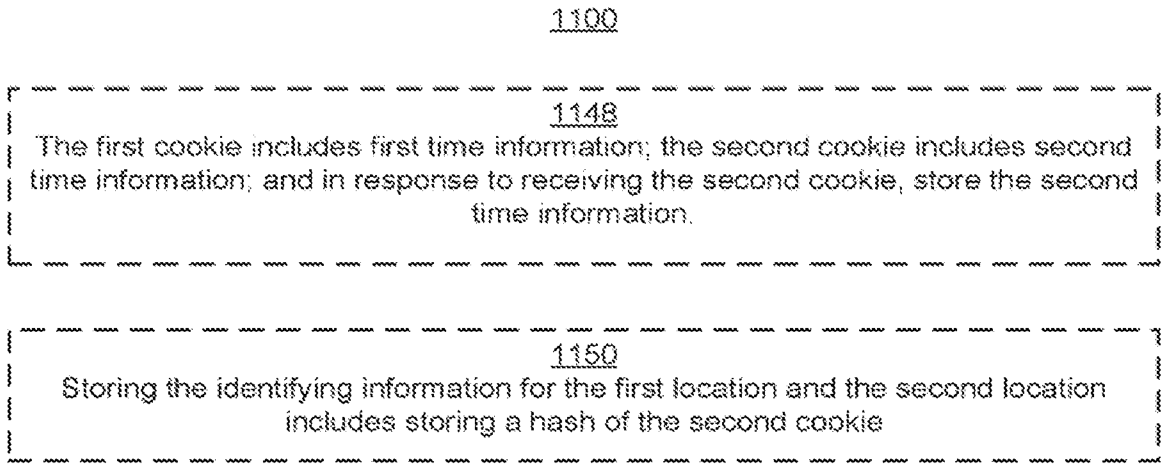

FIG. 10 illustrates a cookie analysis module 220, in accordance with some embodiments. Cookie analysis module 220 includes a pattern storage module 1002 and/or a pattern analysis module 1004. Pattern storage module 1002 stores data that correspond to one or more patterns identified by pattern analysis module 1004. For example, patterns stored in pattern storage module 1002 during a learning phase are used by pattern analysis module 1004 to determine criteria for valid requests for website locations. Pattern analysis module 1004 includes, for example, pattern frequency analysis module 1006, access time analysis module 1008, API access analysis module 1010, and/or location analysis module 1012. In some embodiments, pattern frequency analysis module 1006 counts instances of pattern types stored by pattern storage 1002 (e.g., as described below with regard to 1124 of FIG. 11). In some embodiments, access time analysis module 1008 uses time stamps associated with requests (e.g., as stored by pattern storage 1002) to determine typical (e.g., average) time intervals between two requests in a sequence of requests (e.g., as described below with regard to 1148 of FIG. 11). In some embodiments, API access analysis module 1010 determines a sequence of API calls that occur in connection with legitimate access to website locations (e.g., as described below with regard to 1144 of FIG. 11). In some embodiments, location analysis 1012 determines whether access to particular locations of website 300 is legitimate (e.g., requests for some locations of website 300 may never be legitimate).

FIGS. 11A-11E are flow diagrams illustrating a method 1100 for storing a path profile, in accordance with some embodiments. The method 1100 is performed at a device, such as proxy device 104. For example, instructions for performing the method 1100 are stored in the memory 204 and executed by the processor(s) 202 of the proxy device 104.

The device receives (1102) from a first remote device (e.g., user device 246), a first request to access a first location of a website (e.g., website 300). For example, the request is generated by an application 102 executing on user device 246 (e.g., as described with regard to operation 108 (FIG. 1). The first location is, e.g., a location in a structure of website 300 as described with regard to FIG. 3.

The device transmits (1104), to a server (e.g., server 106) that corresponds to the website 300, the first request to access the first location (e.g., as described with regard to operation 110 (FIG. 1). For example, the first request is the request of operation 1102 or a modified version of the request.

The device receives (1106), from the server, a first cookie (e.g., cookie 502) that includes identifying information for the first location (e.g., as described with regard to operation 112 (FIG. 1).

In response to receiving the first cookie, the device stores (1108) the identifying information for the first location (e.g., as described with regard to operation 114 (FIG. 1). For example, the device stores the first cookie, information from the first cookie, and/or a modified (e.g., hashed or encrypted) version of the first cookie.

The device receives (1110), from the first remote device, a second request to access a second location of the website (e.g., as described with regard to operation 118 of FIG. 1). The second location is distinct from the first location and the second request includes the identifying information for the first location (e.g., the second request includes the first cookie (e.g., the text of the first cookie) or a modified version of the first cookie).

The device transmits (1112), to the server 106, the second request to access the second location (e.g., as described with regard to operation 122 of FIG. 1).

The device receives (1114), from the server, a second cookie (e.g., cookie 602) that includes the identifying information for the first location and identifying information for the second location (e.g., as described with regard to operation 124 of FIG. 1). For example, the second cookie includes the first cookie or the modified version of the first cookie.

In response to receiving the second cookie, the device stores (1116) a first path profile that includes the identifying information for the first location and the identifying information for the second location (e.g., by storing the second cookie, storing information from the second cookie, and/or storing a modified version of the second cookie). In some embodiments, a set of operations including receiving a request, transmitting a request, receiving a cookie, and storing path data is repeated, e.g., until a minimum number of locations (e.g., three locations) are included in the path. In some embodiments, identifying information for a location is a representation of a type of location, so that the path data indicates a pattern among types of locations in a website rather than absolute website locations.

In some embodiments, operations 1102-1114 are performed during a learning phase, and a cookie (e.g., the first cookie, such as 502, the second cookie, such as 602, or a subsequent cookie such as 702 or 802), and/or a pattern determined using multiple cookies, is used during an enforcement phase to perform one or more enforcement operations.

In some embodiments, (e.g., while a learning mode is active) the device stores (1118) a plurality of path profiles that include at least the first path profile and a second path profile. For example, the plurality of path profiles are stored in pattern storage 1002 of cookie analysis module 220.

In some embodiments, the device uses (1120) the plurality of path profiles to generate at least one path pattern. In some embodiments, a path profile is a cookie that includes path information. In some embodiments, pattern analysis module 1004 of cookie analysis module 220 analyzes the patterns stored in pattern storage 1002 to generate the at least one path pattern.

In some embodiments, at least one path pattern includes (1122) a pattern that indicates a tier-to-tier traversal of the website (e.g., a pattern is a record of one or more tier-to-tier traversals of the website that are not specific to particular content within a tier). FIG. 4 illustrates exemplary tiers in a website 300. For example, a path pattern that indicates a tier-to-tier traversal is extracted from cookie 802, which indicates a pattern that traverses from tier 1 to tier 2, then to tier 3, and then to tier 4 (as illustrated in FIG. 4). An additional cookie including information for a path from location 1, to location 5, to location 6, and then to location 7 would also indicate a pattern that traverses tier 1-tier 2-tier 3-tier 4. On the basis of cookie 802 and the additional cookie, pattern analysis module 1004 determines that any request for a location that follows a pattern along a path from tier 1 to tier 2 to tier 3 to tier 4, regardless of location within a tier, is a valid path. The valid path is used to perform one or more enforcement operations (e.g., delaying or forgoing transmission of a request to access a location).

In some embodiments, for a respective path profile of the plurality of path profiles (e.g., stored in pattern storage 1002), the device (e.g., a pattern frequency analysis module 1006 of the device) determines (1124) whether the respective path profile includes a first path characteristic (e.g., a tier-to-tier traversal of the website, such as a traversal from the homepage to a first sub-page). In accordance with a determination that the respective path profile includes the first path characteristic, the device increments a counter that corresponds to the first path characteristic (e.g., a counter is incremented for each cookie that traverses a particular tier-to-tier path, such as a path from tier 1 to tier 2 to tier 3 to tier 4). In some embodiments, incrementing the counter is repeated for each path profile that includes the first path characteristic (e.g., as the profile is created). In this way, a set of valid access patterns is established (e.g., a pattern is added to a set of valid access patterns when a counter that corresponds to the pattern exceeds a threshold value). In some embodiments, a request for a location that matches a pattern that occurs with insufficient frequency (the counter that corresponds to the pattern does not exceed the threshold value) causes one or more enforcement operations to be performed. In some embodiments, it is determined wither one or more respective path profiles of the plurality of path profiles includes a second path characteristic (e.g., an amount of time between requests in a sequence of requests).

In some embodiments, the device receives (1126), from a second remote device 248, a third request to access the second location of the website 300. For example, the request is generated by an application 102 executing on user device 248 (which is distinct from user device 246). The device determines (1128) whether the third request meets legitimate request criteria. In accordance with a determination that the third request meets the legitimate request criteria, the device transmits (1130), to the server, the third request to access the second location. In accordance with a determination that the third request does not meet the legitimate request criteria, the device performs one or more enforcement operations.

In some embodiments (1132), the third request meets the legitimate request criteria when the third request includes the identifying information for the first location. For example, the third request includes identifying information for the first location that was received from server 106 via proxy 104 in response to a prior request for access to the first location. In some embodiments, the third request does not meet the legitimate request criteria when the third request does not include the identifying information for the first location.

In some embodiments (1134), the third request meets the legitimate request criteria when the third request includes the identifying information for the second location. For example, the third request includes identifying information for the second location, indicating that the second remote device 248 was previously provided with information indicating authorization to access the second location. In some embodiments, the third request does not meet the legitimate request criteria when the third request does not include the identifying information for the second location.

In some embodiments, the one or more enforcement operations include (1136) delaying or forgoing transmission of the third request to access the second location. For example, transmission of the third request is delayed for a predetermined amount of time. In some embodiments, transmission of the third request is delayed pending completion of one or more validation operations (e.g., requesting validating information from the third device).

In some embodiments (1138), the one or more enforcement operations include transmitting information associated with the third request (e.g., the request and/or information about the source of the request, such as identifying information) to an enforcement analysis (e.g., bot detector) module (e.g., enforcement module 230). In some embodiments, the enforcement module 230 determines whether the third request matches or is similar to a threshold number of other requests (e.g., received during a predetermined time frame, such as a predetermined amount of time before the third request was received). For example, the enforcement module 230 determines whether the third request is a request that is among multiple requests that constitute a denial of service attack.

In some embodiments, the one or more enforcement operations include (1140) modifying the third request, wherein the modified third request is a request to access an alternative location that is distinct from the requested second location. In some embodiments, the alternative location is a default location (e.g., a website location that displays information indicating that the request is denied).

In some embodiments, the one or more enforcement operations include (1142) determining whether a stored invalid request value meets invalidation criteria. In some embodiments, the one or more enforcement operations include incrementing a stored invalid request value counter. In some embodiments, the invalidation criteria are met when the stored invalid request value exceeds a threshold count. In some embodiments, the stored invalid request value is a ratio of invalid requests to valid requests and the invalidation criteria are met when the stored invalid request value exceeds a threshold ratio. In this way, when a number of incoming requests that are determined to be invalid exceeds a threshold count, subsequent requests from the second remote device and/or subsequent requests having parameters that match parameters of the third request are invalidated.

In some embodiments (1144), the second location corresponds to an application programming interface (API) call, the third request meets the legitimate request criteria when the third request includes API call information that corresponds to the second location, and the third request does not meet the legitimate request criteria when the third request does not include the API call information that corresponds to the second location. In some embodiments, the API call information that corresponds to the second location includes information that corresponds to one or more API calls made prior to the third request. For example, when valid access to the second location requires a series of API calls made prior to and/or including the request for the second location, the legitimate request criteria are met when the series of API calls are performed.

In some embodiments, the first location corresponds to an application programming interface (API) call, the third request meets the legitimate request criteria when the third request includes API call information that corresponds to the first location, and the third request does not meet the legitimate request criteria when the third request does not include the API call information that corresponds to the first location.

In some embodiments, the website includes (1146) a root domain level (e.g., location 1 of website 300) and a plurality of subdomain levels (e.g., locations 2-9 of website 300), the second location corresponds to a respective subdomain level of the plurality of subdomain levels, the third request meets the legitimate request criteria when the third request includes identifying information associated with the respective subdomain level (e.g., identifying information associated the root domain and/or at least one subdomain above the respective subdomain level), and the third request does not meet the legitimate request criteria when the third request does not include identifying information associated with the respective subdomain level.

In some embodiments (1148) the first cookie includes first time information (e.g., a first timestamp). In some embodiments, in response to receiving the first cookie, the device stores the first time information. In some embodiments, the second cookie includes second time information (e.g., a second timestamp and/or information indicating a time that passed between the time indicated by the first timestamp and a time at which the second request was received by the server). In response to receiving the second cookie, the device stores the second time information. In some embodiments, the third request includes third time information (e.g., a third timestamp) and determining whether the third request meets the legitimate request criteria includes comparing the third time information and time information from a prior request by the second remote device (e.g., to determine whether a time difference between the third timestamp and a timestamp of the (e.g., immediately) prior request is not less than (e.g., by a threshold amount) a difference between the first time stamp and the second timestamp). In some embodiments, determining whether the third request meets the enforcement criteria includes determining whether the third request includes time information.

In some embodiments, storing the identifying information for the first location includes storing a hash of the first cookie and/or storing the identifying information for the first location and the second location includes storing a hash (1150) of the second cookie. In some embodiments, determining whether the third request meets the legitimate request criteria includes determining whether a hash of a cookie included in the third request matches a hash of at least one of the first cookie and the second cookie.

FIG. 12 is a flow diagram illustrating a method 1200 for validating a request for a location of a website, in accordance with some embodiments. The method 1200 is performed at a device, such as proxy device 104. For example, instructions for performing the method 1200 are stored in the memory 204 and executed by the processor(s) 202 of the proxy device 104.

The device establishes (1202), during a training phase, a set of one or more valid access patterns for a website 300 (e.g., valid access patterns as determined by cookie analysis module 220). A respective valid access pattern of the set of one or more valid access patterns includes information that corresponds to one or more locations (e.g. locations as illustrated with regard to FIG. 3) of the website 300. For example, in some embodiments, a valid access pattern indicates a tier-to-tier traversal sequence of the website 300, a sequence of APIs, or other pattern as described above.

The device receives (1204), from a remote device (e.g., user device 246), a request to access a first location of a website. For example, the request is generated by an application 102 executing on user device 246 (e.g., as described with regard to operation 108 (FIG. 1). The first location is, e.g., a location in a structure of website 300 as described with regard to FIG. 3.

The device determines (1206), using the set of one or more valid access patterns, whether the request to access the first location of the website is a valid request. For example, in accordance with a determination that a request to access the first location does not correspond to any valid access patterns in the set of one or more valid access patterns, the device determines that the request to access the first location of the website is not a valid request.

In accordance with a determination that the request to access the first location of the website is a valid request, the device transmits (1208) the request to the server 106.

In accordance with a determination that the request to access the first location of the website is not a valid request, the device performs (1210) one or more enforcement operations.

Features of the present invention can be implemented in, using, or with the assistance of a computer program product, such as a storage medium (media) or computer readable storage medium (media) having instructions stored thereon/in which can be used to program a processing system to perform any of the features presented herein. The storage medium (e.g., memory 204) can include, but is not limited to, high-speed random access memory, such as dynamic random access memory (DRAM), static random access memory (SRAM), double data rate random access memory (DDR RAM) or other random access solid state memory devices, and may include non-volatile memory, such as one or more magnetic disk storage devices, optical disk storage devices, flash memory devices, or other non-volatile solid state storage devices. Memory 204 optionally includes one or more storage devices remotely located from the central processing unit (CPU) (s) 202. Memory 204, or alternatively the non-volatile memory device(s) within memory 204, comprises a non-transitory computer readable storage medium.

Stored on any one of the machine readable medium (media), features of the present invention can be incorporated in software and/or firmware for controlling the hardware of a processing system, and for enabling a processing system to interact with other mechanism utilizing the results of the present invention. Such software or firmware may include, but is not limited to, application code, device drivers, operating systems, and execution environments/containers.

Communication systems as referred to herein (e.g., communication system 208) optionally communicate via wired and/or wireless communication connections. Communication systems optionally communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. Wireless communication connections optionally use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), high-speed packet access (HSPA), HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE (Institute of Electrical and Electronics Engineers) 102.11a, IEEE 102.11ac, IEEE 102.11ax, IEEE 102.11b, IEEE 102.11g and/or IEEE 102.11n), voice over Internet Protocol (VOIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if' may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

The invention claimed is:

1. A method comprising:

based on receipt from a remote device of a first request that includes a first application programming interface (API) call to a website, determining whether the first request is valid based on a first sequence of previous API calls indicated in a first cookie of the first request matching one of a plurality of legitimate sequences of API calls that corresponds to legitimate use of the first API call;

based on a determination that the first request is valid, transmitting the first request to a server corresponding to the website, wherein the remote device is remote with respect to the server, and based on a determination that the first request is invalid, delaying or foregoing transmission of the first request to a server corresponding to the website.

2. The method of claim 1 further comprising learning in advance the plurality of legitimate sequences of API calls for legitimate accesses of the website.

3. The method of claim 2, wherein learning the plurality of legitimate sequences of API calls also comprises learning minimum time intervals between at least some of the API calls in each of the plurality of legitimate sequences of API calls.

4. The method of claim 3, wherein determining whether the first request is valid further comprises determining whether a time interval between the first request and a most recent of the first sequence of previous API calls satisfies a minimum time interval learned for the first API call and a preceding legitimate API call in the corresponding one of the plurality of legitimate sequence of API calls.

5. The method of claim 1 further comprising determining that the first sequence of previous API calls includes a minimum number of API calls, wherein determining whether the first request is valid is also based on determining that the first sequence of previous API calls includes the minimum number of API calls.

6. The method of claim 5, wherein each of the plurality of legitimate sequences of API calls includes at least a minimum number of API calls.

7. The method of claim 1, wherein the first sequence of previous API calls corresponds to different locations of the website.

8. The method of claim 1 further comprising, based on receipt of a first response from the server that includes a second cookie, recording the first sequence of previous API calls and information in the second cookie about the first API call into a third cookie and transmitting the third cookie to the remote device.

9. A non-transitory computer readable storage medium storing one or more programs, the one or more programs comprising instructions to:

protect a website from attacks using legitimate access patterns, wherein the instructions to protect the website comprise instructions to, for each successive request from a remote device to access a website after a minimum number of requests from the remote device to access the website, determine whether the successive request is valid based on a first sequence of API calls indicated in preceding ones of the successive requests conforming to a first of the legitimate access patterns that corresponds to a first API call indicated in the successive request;

based on a determination that the request is valid, transmit the successive request to a server corresponding to the website, wherein the remote device is remote with respect to the server; and based on a determination that the successive request is invalid, delay or forego transmission of the successive request to a server corresponding to the website.

10. The non-transitory computer readable storage medium of claim 9, wherein the one or more programs further comprise instructions to learn in advance a plurality of legitimate sequences of API calls for legitimate accesses of the website, wherein the legitimate access patterns correspond to the plurality of legitimate sequences of API calls.

11. The non-transitory computer readable storage medium of claim 10, wherein the instructions to learn the plurality of legitimate sequences of API calls also comprise instructions to learn minimum time intervals between at least some of the API calls in each of the plurality of legitimate sequences of API calls.

12. The non-transitory computer readable storage medium of claim 11, wherein the instructions to determine whether a request is valid further comprise instructions to determine whether a time interval between the request and immediately preceding request from the remote device to access the website satisfies a minimum time interval learned for the first API call and a preceding legitimate API call in the corresponding one of the plurality of legitimate sequence of API calls.

13. The non-transitory computer readable storage medium of claim 9, wherein each of access patterns includes at least a minimum number of API calls.

14. The non-transitory computer readable storage medium of claim 9, wherein each successive requests corresponds to at least one of a different location of the website and a different API call.

15. The non-transitory computer readable storage medium of claim 9, wherein the instructions to determine whether a request is valid based on a first sequence of API calls indicated in preceding ones of the successive requests conforming to a first of the legitimate access patterns that corresponds to a first API call indicated in the request comprise instructions to read a cookie of the request to determine the first sequence of API calls.

16. The non-transitory computer readable storage medium of claim 9, wherein the one or more programs further comprise instructions to, based on receipt of a response from the server that includes a first cookie with information about the first API call, record the first sequence of previous API calls and the information about the first API call in the first cookie into a second cookie and transmit the second cookie to the remote device.

17. A system comprising:

a processor; and memory having stored thereon instructions executable by the processor to cause the system to protect a website from attacks using legitimate access patterns, wherein the instructions to protect the website comprise instructions to, for each successive request from a remote device to access a website after a minimum number of requests from the remote device to access the website, determine whether the successive request is valid based on a first sequence of API calls indicated in preceding ones of the successive requests conforming to a first of the legitimate access patterns that corresponds to a first API call indicated in the successive request;

based on a determination that the successive request is valid, transmit the successive request to a server corresponding to the website, wherein the remote device is remote with respect to the server; and based on a determination that the successive request is invalid, delay or forego transmission of the successive request to a server corresponding to the website.

18. The system of claim 17, wherein the memory further has stored thereon instructions executable by the processor to cause the system to learn in advance a plurality of legitimate sequences of API calls for legitimate accesses of the website, wherein the legitimate access patterns correspond to the plurality of legitimate sequences of API calls.

19. The system of claim 17, wherein the instructions to determine whether a request is valid based on a first sequence of API calls indicated in preceding ones of the successive requests conforming to a first of the legitimate access patterns that corresponds to a first API call indicated in the request comprise instructions executable by the processor to cause the system to read a cookie of the request to determine the first sequence of API calls.

20. The system of claim 17, wherein the memory further has stored thereon instructions executable by the processor to cause the system to, based on receipt of a response from the server that includes a first cookie with information about the first API call, record the first sequence of previous API calls and the information about the first API call in the first cookie into a second cookie and transmit the second cookie to the remote device.

* * * * *